Figure 1:
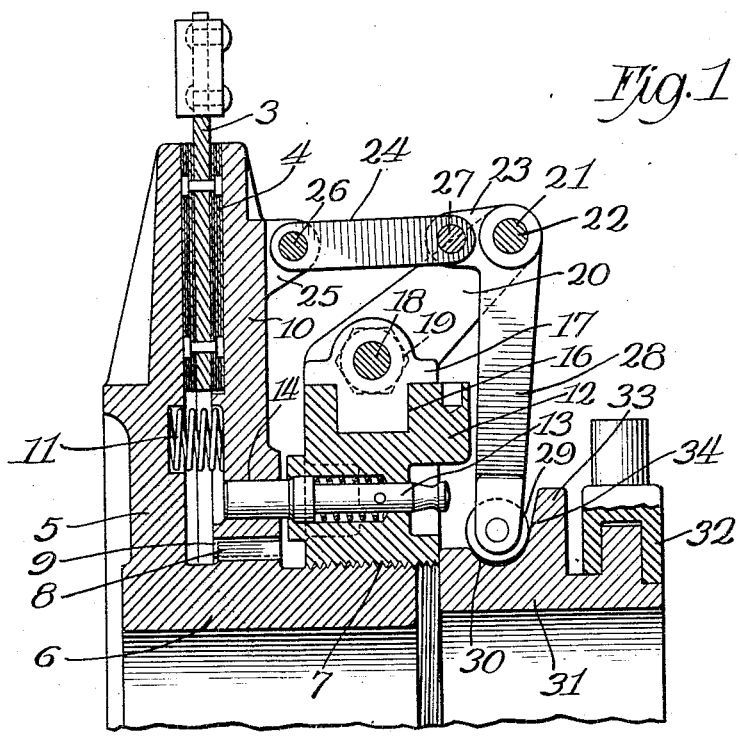

Aug. 2, 1932.  W. J. PEARMAIN  1,869,982

CLUTCH

Filed Aug. 19, 1929

Inventor:
William J. Pearmain
By his Attys.

Patented Aug. 2, 1932

1,869,982

UNITED STATES PATENT OFFICE

WILLIAM J. PEARMAIN, OF RACINE, WISCONSIN, ASSIGNOR TO THE TWIN DISC CLUTCH COMPANY, OF RACINE, WISCONSIN, A CORPORATION OF WISCONSIN

CLUTCH

Application filed August 19, 1929. Serial No. 386,840.

My invention relates to that type of clutch in which an intermediate friction plate or ring, attached to one of two revoluble concentric members, as for example a fly wheel, is embraced, on opposite sides, respectively, by fixed and floating clamping members attached to the other of said revoluble members, as for example, a power shaft, means being provided for engaging and disengaging the clamping plates with the friction plate. The object of the invention is to provide a clutch of this character the operation of which is substantially unaffected by rapid rotation and the centrifugal action due thereto and in which the clutch is closed by action exerted on the floating clamping plate approximately equi-distant from the inner and outer peripheries of the annular friction surfaces.

Figure 2:
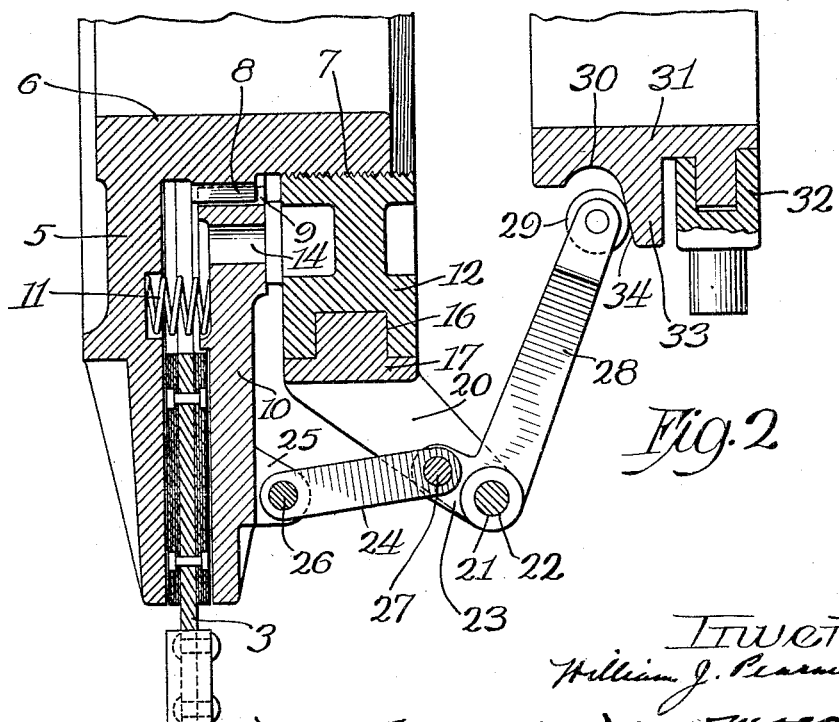

In the drawing accompanying and forming a part of this specification,

Figure 1 is a diametric axial section through half of a clutch embodying my invention, shown in the closed position; and Fig. 2 is a similar view showing the other half of the clutch but in open or unengaged position.

The friction plate 3 may be of usual construction, and faced with friction material as at 4. It may be attached either to the driving or driven member, though as will hereinafter appear, the clutch is of particular advantage in situations where the friction plate is attached to the driven member and in the following descriptive matter it will be so described.

The fixed clamping member 5 may be keyed, as usual, or otherwise secured to the shaft which in the preferred use of the clutch constitutes the driving member. The hub 6 of the fixed clamping member is exteriorly threaded at 7, and intermediate the clamping plates proper and the threaded portion the hub is formed exteriorly with teeth or ribs 8 which cooperate with grooves 9 formed on the inner periphery of the floating clamping plate 10. By reason of this rib and groove construction the floating clamping plate revolves with the fixed clamping plate but is free to move axially thereof. Between the two clamping plates and within the inner periphery of the friction plate a series of coiled springs 11 are seated and compressed and tend to separate the clamping plates from the friction plate.

An internally threaded collar 12 is screwed upon the threaded end of the hub of the fixed clamping plate and is provided with a spring pressed locking pin 13 adapted to engage any one of an annular series of holes 14 formed in the floating clamping plate. By withdrawing the locking pin the collar 12 may be rotated to adjust it toward or from the clamping plate for the purpose of adjusting the pressure of the clamping plate on the friction plate as will presently appear.

The collar 12 is annularly grooved at 16 on its outside surface and a split ring 17, the sections of which are bolted together as by bolts 18 and nuts 19, (the latter being shown in dotted lines in Fig. 1), is fitted into said groove, said ring being free to revolve in said groove. At suitable intervals about its periphery the ring is formed with ears or yoke members 20 arranged in pairs and perforated at their outer ends as at 21 to receive pivot pins 22, upon which the bell crank levers now to be described are fulcrumed. There may be four levers evenly spaced about the periphery of the ring. The shorter arms 23 of the bell crank levers are connected by links 24 with the floating clamping plate 10, the latter being provided with pairs of lugs 25 between which the inner ends of the respective links are pivoted upon pins 26. It is to be observed that the points of attachment of the links to the floating clamping plate and the fulcrums of the levers are substantially equally distant, radially, from the axis of the clutch. For operation the collar 12 is so adjusted that when the clutch is closed the axes of the pivot pins 27 connecting the links to the bell crank levers are substantially in the line connecting the axes of the pivot pins 22, 26. As a result of this construction coupled with the fact that provision is made against the bell crank levers swinging too far in their closing action, not only is the maximum toggle action secured but the position of levers and links insures the clutch remaining in closed positions until released by the operator. The longer arms 28 of the bell crank levers are provided with rollers 29 which enter a groove 30 in the sliding sleeve 31, adapted to fit about the shaft on which the clutch is mounted. A shifting ring for axially moving the sleeve 31 is indicated at 32. Preferably, and particularly, when a second similar clutch is to be mounted on the shaft for duplex action an annular flange 33 is formed on the sleeve 31, one side of the flange being tapered or inclined as at 34 and constituting a continuation of the wall of the groove 30. This permits a somewhat greater range of movement of the sliding sleeve.

The operation of the clutch will be apparent from the foregoing description. When the sleeve is moved to the right, as shown in Fig. 2, the toggle joint is broken and the springs 11 operate to spread the clamping plates and release the friction plate, the long ends of the bell crank levers move outwards under centrifugal action and exert a pull on plate 10 through links 24, thereby pulling it against the stops provided on ring 12, and keeping the plates 5 and 10 apart. When the sleeve 31 is moved to the left, as shown in Fig. 1, the bell crank levers and links force the clamping members into close engagement with the friction plate. The abutment of the sleeve 31 against the face of the collar 12 so limits the movement of the bell crank levers that when the clutch is closed the pivots 27 connecting the links and bell crank levers are substantially in alignment with the pins 26 connecting the links to the floating clamping plate and the fulcrum pins 22 of the levers so locking the clutch.

I claim:

In a clutch of the class described, a friction plate, clamping plates on opposite sides of said friction plate and movable into and out of engagement therewith, one of said clamping plates being adapted to be mounted on a shaft and the other of said clamping plates floating axially with respect to the first mentioned clamping plate but rotating therewith, a collar axially adjustable upon the first mentioned clamping plate, a ring rotatably mounted on said collar, rectangular bell crank levers fulcrumed on said ring the shorter arms of said bell crank levers extending toward the clamping plates and the longer arms thereof extending toward the axis of the clutch, links connecting the short arms of the bell crank levers with the floating clamping plate and a sleeve adapted to slide on the shaft and engaging the longer arms of the bell crank levers for operating the same.

In testimony whereof, I have subscribed my name.

WILLIAM J. PEARMAIN.